UNITED STATES PATENT OFFICE.

JOHN F. COLLINS, OF NEW YORK, N. Y.

IMPROVEMENT IN DISTILLATION.

Specification forming part of Letters Patent No. 59,187, dated October 30, 1866.

*To all whom it may concern:*

Be it known that I, JOHN F. COLLINS, of the city, county, and State of New York, have invented a certain new and useful Improvement in Distillation; and I do hereby declare that the following is a full, clear, and exact description of the same, which consists in an improved process and treatment for separating volatile matters from the substances which contain them. It is applicable to the production and manufacture of alcohol, rum, and other spirits, as well as to other articles which are obtained by distillation.

I shall now describe my said process of obtaining and separating alcohol and other spirits from mash or other substances.

The mash or other substance from which alcohol or other spirit is sought to be separated is placed in a still, retort, or boiler having an open mouth. Any form of still or retort to which heat can be applied, either within or without, may be used in carrying out my invention. The mouth of the still, retort, or other vessel is situated beneath the inverted mouth of a conductor or the enlarged inverted end of a pipe which leads to the condenser or worm, it being required that the mouth of the still or retort shall be smaller than the mouth of the conductor or pipe, so that an annular or continuous space will be left between them for the free passage of air into the conductor or pipe, the mouth of the still and the mouth of the conductor or pipe being detached, one from the other, but the former being vertically beneath the latter, so that the vapors, as they rise, will pass directly into the conductor or pipe. Heat is then applied to the mash or other substance under treatment in any proper way to produce and maintain vaporization, the contents of the still or retort being constantly agitated during the process by means of steam or gas or air introduced into the mass through suitable pipes, one or more, as desired. As the vapors rise they pass out of the mouth of the still or retort into the conductor or pipe above, being met in doing so by currents of air from without, which rush into the conductor through the space between its mouth and the mouth of the still or vessel below, and both the vapors and the air forced toward the worm or condenser.

Having described my invention, what I claim, and desire to secure by Letters Patent, is—

The process, substantially as above described, of separating and obtaining alcohol or other volatile matters by constantly agitating the mash or other contents of the still or retort by means of a current or currents of steam or gas or air forced into the same, and bringing the vapors in contact with currents of air from without while passing from the still or retort into the conductor which leads to the worm or condenser, as above set forth.

In testimony whereof I have hereunto set my signature.

JOHN F. COLLINS.

Witnesses:
H. C. BANKS,
A. NEILL.